May 13, 1952     S. E. HEDSTROM     2,596,685
REGULATOR WITH SATURABLE CORE
Filed Sept. 17, 1947

Inventor
Sven Eric Hedström.
By [signature]
Attorney.

Patented May 13, 1952

2,596,685

UNITED STATES PATENT OFFICE 2,596,685

REGULATOR WITH SATURABLE CORE

Sven Eric Hedström, Ludvika, Sweden, assignor to Allmanna Svenska Elektriska Aktiebolaget, Vasteras, Sweden, a Swedish corporation Application September 17, 1947, Serial No. 774,536
In Sweden September 21, 1946

4 Claims. (Cl. 323—66)

Direct current saturable reactors are, as is known, often provided with a self-magnetisation for increasing the ratio between the output and input power. The self-magnetisation is presently generally of so called internal or spare type with unidirectional valves connected directly in series with the reactor elements, which is much more simple than the use of a separate rectifier for the self-magnetisation. The self-magnetisation obtained in the former way cannot, however, by reason of the imperfection of the valves and of the iron core, generally be what is termed a hundred per cent one, which notion implies that the output current of the saturable reactor is varied between its extreme values for a minimum variation of the controlling ampere turns. Different methods have been proposed for obtaining the additional magnetisation necessary for reaching the hundred per cent self-magnetisation. The present invention refers to a device for this purpose in regulators utilizing direct current saturable reactors, which is more simple than most ones by the reason that it does not require any separate winding on the reactor. The arrangement is in the first line characterized by the additional magnetizing current flowing in a winding serving the purpose of comparison for the regulation.

Figure 1:
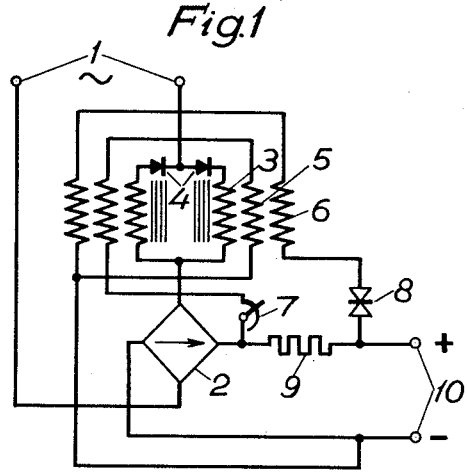
Figure 2:
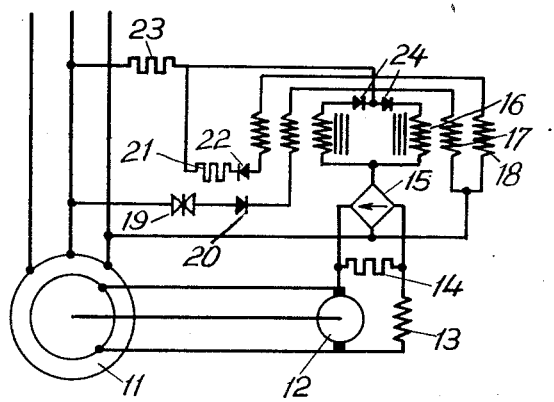

Two forms of the invention are diagrammatically illustrated in the accompanying drawing in Figs. 1 and 2.

Fig. 1 shows a voltage regulator for a direct current consumer 10 fed from a pair of alternating current terminals 1 across a rectifier 2, said consumer consisting for instance of a storage battery. The rectifier is controlled by a direct current saturable reactor 3 with an internal self-magnetisation obtained by the unidirectional valves 4 in series with the alternating current winding elements 3 and with two mutually opposing direct current windings 5, 6. One 5 of these is fed from the voltage to be regulated through a constant resistance 7 and acts in the same sense as the self-magnetisation. The other winding 6, which opposes the self-magnetisation, is connected to the voltage to be regulated through a voltage-dependent resistance 8 having such a characteristic that on variations of the voltage larger variations in proportion occur in the current.

According to this form of the present invention, the connections of the two aforesaid circuits to one of the voltage terminals are not made to the same point but are separated by a resistance 9, which makes the co-operating winding 5 carry a current component proportional to the alternating current traversing the reactor and co-operating with the self-magnetisation in addition to the current component proportional to the direct current voltage. By suitably dimensioning and adjusting the resistance 9, this component may be so adapted that the desired shape is obtained for the characteristic curve of the reactor.

Fig. 2 shows a voltage regulator for an alternating current generator 11 having a rotating exciter 12. The self-fed winding 13 of the latter is, in a manner known per se, connected in series with a resistance 14, on which a current is impressed from a rectifier 15 controlled by a direct current saturable reactor 16. The latter is provided with a self-magnetisation of the same type as in Fig. 1, having two unidirectional valves 24 in series with the alternating current winding elements 16 and two mutually opposing direct current windings 17, 18. The winding 17, acting in the same sense as the self-magnetisation obtained by the valve 24, is connected to the voltage of the alternating current generator through a voltage-dependent resistance 19 and a rectifier 20, while the opposing winding 18 is connected to the same voltage through an essentially constant resistance 21 and a rectifier 22. The current controlled by the reactor opposes the excitation of the exciter. The alternating current winding of the reactor is also connected to the machine voltage.

According to this form of the invention, a separate resistance 23 is connected in series to the alternating current winding, and the comparison circuit containing a constant resistance is not directly connected to one alternating current terminal but between the said resistance and the alternating current winding of the reactor. The winding 18 will therefore carry a negative current component, which is proportional to the alternating current traversing the reactor and thus also to the voltage across the load of the reactor, which, especially on account of the rectification, has an essentially ohmic character. Since the winding 18 opposes the self-magnetisation, the aforesaid negative current component is equivalent to an increase of the self-magnetisation.

A direct current saturable reactor employed in a regulator is often magnetized in such manner that one winding thereof carries a constant current and another winding opposing the former one carries a current proportional to the quantity to be regulated. In this case, either of the circuits of these currents may contain an impedance analogous to the impedance 9 or 23, respectively, and traversed by the load current of the reactor or by a current proportional thereto.

I claim as my invention:

1. Electric regulator for the regulation of an electric or other quantity comprising a direct current saturable reactor having rectifying valve elements in series with reactor winding elements for self-magnetization, at least one direct current saturating winding of said reactor traversed by a current depending on the quantity to be regulated, and means for forcing an additional direct current component proportional to the output current of said reactor through said saturating winding.

2. Electric regulator for the regulation of an electric or other quantity comprising a direct current saturable reactor having rectifying valve elements in series with reactor winding elements for self-magnetization, mutually opposing direct current saturating windings of said reactor traversed by currents depending on the quantity to be regulated, and means for forcing an additional direct current component proportional to the output of said reactor through one of said saturating windings.

3. Electric regulator comprising a direct current saturable reactor having rectifying valve elements in series with reactor winding elements for self-magnetization, mutually opposing direct current saturating windings of said reactor traversed by currents obtained from a common voltage through impedances having different characteristics, one of said windings being also traversed by a current component obtained from a voltage across one of said impedances.

4. Electric regulator for the regulation of an electric or other quantity comprising a direct current saturable reactor having rectifying valve elements in series with reactor winding elements for self-magnetization, a saturating direct current winding of said reactor traversed by a current proportional to the deviation of the quantity to be regulated from its normal value, and an impedance traversed by a current proportional to the output current of said reactor forming part of the circuit of said saturating winding.

SVEN ERIC HEDSTRÖM.

REFERENCES CITED

The following references are of record in the file of this patent:

UNITED STATES PATENTS

| Number | Name | Date |
|--------|------|------|
| 2,066,919 | West | Jan. 5, 1937 |
| 2,169,093 | Edwards | Aug. 8, 1939 |
| 2,309,156 | Andrews | Jan. 26, 1943 |
| 2,322,130 | Hedding | June 15, 1943 |
| 2,331,411 | Milarta | Oct. 12, 1943 |
| 2,399,185 | Hedding | Apr. 30, 1946 |
| 2,431,311 | Cronvall | Nov. 25, 1947 |
| 2,470,556 | Hedstrom et al. | May 17, 1949 |